United States Patent
Yamaguchi et al.

(10) Patent No.: US 6,749,753 B1
(45) Date of Patent: Jun. 15, 2004

(54) FILTER OF HIGH ACCURACY

(75) Inventors: Osamu Yamaguchi, Moriyama (JP);
Shigenori Fukuda, Moriyama (JP);
Satoshi Ogata, Amagasaki (JP)

(73) Assignee: Chisso Corporation, Tokyo (JP)

( * ) Notice: Subject to any disclaimer, the term of this patent is extended or adjusted under 35 U.S.C. 154(b) by 0 days.

(21) Appl. No.: 09/685,394

(22) Filed: Oct. 10, 2000

Related U.S. Application Data (63) Continuation-in-part of application No. 09/068,654, filed on May 12, 1998, now abandoned.

(30) Foreign Application Priority Data

Sep. 25, 1996 (JP) .............................. 8-274049
Sep. 22, 1997 (WO) ................. PCT/JP97/03358

(51) Int. Cl.$^7$ ............................................... B01D 39/16
(52) U.S. Cl. ....................... 210/315; 210/491; 210/496; 210/497.1; 428/36.91; 442/400
(58) Field of Search ................................ 210/315, 342, 210/496, 491, 497.01, 497.1, 497.2, 505, 510.1, 457; 428/36.91; 442/341, 345, 347, 350, 389, 392, 400; 55/487, 528

(56) References Cited

U.S. PATENT DOCUMENTS

| | | | |
|---|---|---|---|
| 4,726,901 A | * | 2/1988 | Pall et al. .................... 210/496 |
| 4,734,208 A | | 3/1988 | Pall et al. |
| 5,225,014 A | | 7/1993 | Ogata et al. |
| 5,275,743 A | * | 1/1994 | Miller et al. ................. 210/492 |
| 5,340,479 A | * | 8/1994 | Szczepanski et al. .... 210/497.1 |
| 5,429,745 A | | 7/1995 | Ogata et al. |
| 5,503,745 A | * | 4/1996 | Ogata et al. ................. 210/490 |
| 5,591,335 A | * | 1/1997 | Barboza et al. .......... 210/323.2 |
| 5,711,878 A | * | 1/1998 | Ogata et al. ................ 156/218 |

FOREIGN PATENT DOCUMENTS

| | | |
|---|---|---|
| JP | 47-23832 | 7/1972 |
| JP | 48-27629 | 8/1973 |
| JP | 51-25874 | 3/1976 |
| JP | 56-49605 | 11/1981 |
| JP | 1-297113 | 11/1989 |
| JP | 4-110005 | 4/1992 |
| JP | 4-131413 | 12/1992 |

* cited by examiner

*Primary Examiner*—Matthew O. Savage
(74) *Attorney, Agent, or Firm*—Fay, Sharpe, Fagan, Minnich & McKee, LLP (57) ABSTRACT

Filters having a high accuracy, small pressure loss, and long filtration life compared with conventional filters are provided. The filters are composed of non-woven fibrous agglomerates and are constructed in such a way that at least two layers of a non-woven fibrous agglomerate of a pre-filtration layer and a precision filtration layer are disposed therein; the pre-filtration layer is constructed in such a way that the diameter of the fibers in the pre-filtration layer becomes gradually smaller toward the direction of filtration; and at least 10% by weight of the fibers in the precision filtration layer are fibers having a diameter smaller than that of the fibers having a smallest diameter in the pre-filtration layer.

2 Claims, 2 Drawing Sheets x: Pre-filtration layer
z: Support layer

Fig. 3 x: Pre-filtration layer    y: Precision filtration layer
z: Support layer

FILTER OF HIGH ACCURACY

This application is a continuation-in-part of U.S. Application Ser. No. 09/068,654, filed May 12, 1998 now abandoned.

TECHNICAL FIELD

The present invention relates to a filter of a high accuracy. More specifically, it relates to a filter having a high accuracy, small initial pressure loss, and long filtration life compared with conventional filters.

BACKGROUND OF THE INVENTION

In recent years, a demand has suddenly increased for filters comprising fibers as their material for removing foreign substances having a particle diameter of about 0.2 μm to several hundred micro-meters contained in solutions of products or others in the field of chemical industry.

Filters comprising fibers as their material have various characteristics such that they are generally inexpensive, that filtration accuracy can unrestrictedly be changed by changing the diameter of fibers from which filters are formed, and that they have a long filtration life since they can capture many particles in void portions between fibers. However, filters having a higher filtration accuracy and longer filtration life than conventional ones have strongly been demanded in some end uses of filters.

Performances of such filters can be evaluated mainly by filtration accuracy, liquid passability, and filtration life. The term "filtration accuracy" as used herein is represented by a smallest diameter of particles which can be captured 99.9% or more, the term "liquid passability" is represented by a pressure loss of a filter when a certain amount of liquid was flowed, and the term "filtration life" is represented by an elapsed time until the pressure loss in a filter generated by a continuous filtration of a dispersion having a certain concentration reaches a value at which renewal of the filter becomes necessary.

Generally, the higher the filtration accuracy of filters, the lower liquid passability and the shorter filtration life the filters have in many cases. However, even with filters of a high filtration accuracy, the liquid passability and filtration life can be improved by making the structure of filter not-uniform in terms of the type of materials or mediums to be used and changing diameter of fibers in a filter and void ratio in the direction of filtration, that is, from the upstream side of a liquid to be passed through the filter toward the downstream side. Heretofore, several methods have been proposed for improving such liquid passability and filtration life.

First, a method is disclosed in Laid-open Japanese Patent Publication No. Hei 7-82649 wherein the amount of a resin to be extruded and the flow velocity of a blowing gas stream are changed with the passage of time in a fiber spinning step by a melt-blow process to continuously change the average diameter of fibers to be spun, and then the fibers are wound round an appropriate winding core. Whereas this method has a merit that the average diameter of fibers which form the filters can comparatively be freely changed, it has a demerit that there is a limit in the range wherein either the amount of a resin to be extruded and flow velocity of a blowing gas stream can be changed and thus that it is difficult to largely change the fiber diameter in the direction of filter thickness (direction of filtration). Besides, it has a defect that it is difficult to produce fine denier fibers since spinning conditions are continuously changed in the method.

In Laid-open Japanese Patent Publication No. Hei 1-297113, a method is disclosed in which several kind of non-woven fabrics having a different fiber diameter are prepared in advance and then the non-woven fabrics are wound round a core having holes to prepare a filter. According to this method, it is possible to largely change the fiber diameter. However, the method has defects that a number of the non-woven fabrics become necessary in order to efficiently perform deep layer filtration, because gentle change of fiber diameter in the direction of the filter thickness is required to achieve the performance, and thus the number of production steps increases and requires much time.

Further, in Japanese Patent Publication No. Sho 56-49605, a method is disclosed wherein a card web of melt adhesive staple fibers is wound round a winding core while heating and applying an appropriate linear pressure on the web, and a melt-blow non-woven fabric is wound together on the way of winding the card web to form a filter. This method has a characteristic that filters having such an extent of accuracy as that of filters prepared by a melt-blow process can be produced while taking advantage of using cheap staple fibers. However, the method has a defect that when the diameter of particles to be captured is extremely smaller than the fiber diameter of staple fibers, small particles are captured only in the inserted melt-blow non-woven fabric and thus the filtration life becomes short.

DISCLOSURE OF THE INVENTION

An object of the present invention is to provide filters having such a high accuracy and long filtration life as those which were unable to be achieved by conventional filters, at a low production cost.

As a result of diligent investigation by the present inventors to solve the problems described above, it has been found that the objects of the present invention can be achieved by disposing at least two layers of a pre-filtration layer and a precision filtration layer in a filter comprising non-woven fibrous agglomerates, constructing the pre-filtration layer so that the diameter of constituting fibers becomes finer in the direction of filtration, and constructing the precision filtration layer with a non-woven fibrous agglomerate comprising fibers having a smaller diameter than that of the fibers having a smallest diameter in the pre-filtration layer to accomplish the present invention.

The present invention is summarized as follows:

(1) A filter of a high accuracy composed of non-woven fibrous agglomerates and comprising at least two layers of a pre-filtration layer and a precision filtration layer disposed in the direction of filtration, the pre-filtration layer is constructed in such a way that the diameter of all or a part of the fibers in the pre-filtration layer becomes gradually smaller toward the direction of filtration, the precision filtration layer comprises one or more piled layers of a non-woven fibrous agglomerate, and the diameter of fibers which account for 10% by weight or more of the fibers in the one or more piled layers of a non-woven fibrous agglomerates is smaller than the diameter of the fibers having a smallest diameter in the pre-filtration layer.

(2) The filter of a high accuracy recited in paragraph (1) above wherein the pre-filtration layer comprises a non-woven fibrous agglomerate comprising at least one kind of fibers selected from the group consisting of polyolefin fibers and polyester fibers.

(3) The filter of a high accuracy recited in paragraph (1) or (2) above wherein the pre-filtration layer comprises a non-woven fibrous agglomerate prepared by a melt-blow process.

(4) The filter of a high accuracy recited in any one of paragraphs (1) to (3) above wherein the fibers in the non-woven fibrous agglomerate of the pre-filtration layer comprise a high melting point component and a low melting point component, the difference in melting point between the high melting point component and the low melting point component is 10° C. or more, and the low melting point component is contained in an amount of 10 to 90% by weight in the pre-filtration layer.

(5) The filter of a high accuracy recited in paragraph (4) above wherein the fibers of the non-woven fibrous agglomerate of the pre-filtration layer are composite fibers comprising a high melting point component and a low melting point component having a difference in melting point of 10° C. or more.

(6) The filter of a high accuracy recited in paragraph (4) above wherein the non-woven fibrous agglomerate of the pre-filtration layer is a mixture of ultrafine fibers of a high melting point component and ultrafine fibers of a low melting point component having a difference in melting point of 10° C. or more.

(7) The filter of a high accuracy recited in any one of paragraphs (1) to (6) above wherein the ratio of a smallest diameter to a largest diameter of fibers in the non-woven fibrous agglomerate of the pre-filtration layer is 1:2 to 1:10.

(8) The filter of a high accuracy recited in any one of paragraphs (1) to (7) above wherein the ratio of the diameter of fibers in the non-woven fibrous agglomerate of the precision filtration layer which comprises fibers having a diameter smaller than that of fibers having a smallest diameter in the pre-filtration layer to a smallest diameter of the fibers in the pre-filtration layer is 1:1 to 1:20.

(9) The filter of a high accuracy recited in any one of paragraphs (1) to (8) above wherein the non-woven fibrous agglomerate of the precision filtration layer which comprises fibers having a diameter smaller than that of the fibers having a smallest diameter in the pre-filtration layer has a void ratio of 45 to 97%.

(10) The filter of a high accuracy recited in any one of paragraphs (1) to (9) above wherein the non-woven fibrous agglomerate of the precision filtration layer which comprises fibers having a diameter smaller than that of the fibers having a smallest diameter in the pre-filtration layer is prepared by a melt-blow process.

(11) The filter of a high accuracy recited in any one of paragraphs (1) to (9) above wherein the non-woven fibrous agglomerate of the precision filtration layer which comprises fibers having a diameter smaller than that of the fibers having a smallest diameter in the pre-filtration layer comprises glass fibers.

(12) The filter of a high accuracy recited in any one of paragraphs (1) to (11) above wherein the filter is in a shape of cylinder.

BRIEF DESCRIPTION OF THE DRAWINGS

In FIGS. 1 and 2, numeral 1 indicates a porous support cylinder, 2 is a support layer, 3 is a precision filtration layer, 4 is a pre-filtration layer, 5a and 5b are end caps, 6a and 6b are flat gaskets, 7 is a film, and solid lines A B indicate examples of lines connecting between the extreme upstream position and the extreme downstream position.

In FIG. 3, symbol x indicates a pre-filtration layer, y is a precision filtration layer, z is a support layer, A is the extreme upstream side, and B is the extreme downstream side.

BEST MODE FOR CARRYING OUT THE INVENTION

As a component of fibers which form the non-woven fibrous agglomerates used in the present invention, thermoplastic resins such as a polyamide, polyester, low melting point copolyester, polystyrene, polyurethane elastomer, polyester elastomer, polypropylene, polyethylene, and polypropylene copolymer (for example, co- or ter-polymer of propylene as a main component with ethylene, butene-1,4-methyl pentene-1, or the-likes) can be mentioned. Particularly from -the viewpoints of price, water resistance, and chemical resistance, polypropylene and polyester can preferably be used. Further, glass fibers may be used for the precision filtration layer.

Next, explanation is given to the pre-filtration layer, which is a part of the filters of the present invention.

Pre-filtration layer is disposed on the extreme upstream side in the direction of filtration of fluids among layers of filter mediums from which the filters of the present invention are formed, and the pre-filtration layer is disposed to capture comparatively large particles in the fluids. The materials used for preparing the pre-filtration layer is a non-woven fibrous agglomerate in which diameter of all or a part of the fibers are arranged to gradually become small in the direction of filtration, and the shape of the pre-filtration layer is preferably web, non-woven fabric, or filter paper. Melt spinning process is preferable as the method for spinning for obtaining non-woven fibrous agglomerates from which the pre-filtration layer is prepared. This is because in the melt spinning process, it is comparatively easy to continuously change the diameter of the fibers to be spun by changing the amount of a resin to be extruded and stretching ratio. As examples of such melt spinning which can continuously change the fiber diameter, an ordinary melt a spinning process, spun bond process, and melt- blow process can be mentioned.

In order to obtain webs in which the fiber diameter is continuously changed through an ordinary melt spinning process, the amount of a resin to be extruded is continuously changed, and the fibers thus formed are stretched, cut, and then fed to a carding machine. As the result, staple fiber webs in which the fiber diameter is changed in the machine direction or lengthwise direction are obtained. As another method, spun bond webs in which the fiber diameter is continuously changed can be obtained by using a spun bond process and continuously changing the drafting force used in the process.

Particularly effective spinning method for preparing a non-woven fibrous agglomerate which forms the pre-filtration layer is a melt-blow process. As the process, such a known process as disclosed in Japanese Patent Publication No. Hei 7-98131 can be used. Melt-blow process is one in which a melted thermoplastic resin extruded from spinning orifices arranged in the mechanical direction of lengthwise direction is blown on a collecting conveyer net or a rotating cylindrical mandrel with a gas stream blown from around the spinning orifices at a high temperature and high velocity to obtain a ultrafine fiber web. Ultrafine fiber webs which are suitable for the non-woven fibrous agglomerate from which the pre-filtration layer is prepared and in which average fiber diameter is changed in lengthwise direction can be obtained by continuously changing spinning conditions such as the amount of a resin to be extruded and ejecting velocity of blowing gas stream at this stage. Particularly, a process in which the ejecting velocity of a blowing gas stream is continuously changed is preferable since the fiber diameter can be changed without the change of METSUKE (basis weight) of webs.

Non-woven fibrous agglomerate which forms the pre-filtration layer comprises a resin component of a high melting point and another resin component of a low melting point having a difference in melting point of 10° C. or more. As the methods for disposing the high melting point component and low melting point component in the non-fibrous agglomerate, the fibers which constitute the non-woven fibrous agglomerate may be formed in a shape of composite fiber comprising a high melting point resin and a low melting point resin; the fibers of a high melting point resin and the fibers of a low melting point resin may be mixed at the stage of spinning; or the fibers of a high melting point resin and the fibers of a low melting point resin may be mixed after spinning. Mixing ratio of the low melting point component in the pre-filtration layer is generally 10 to 90% by weight, preferably 20 to 70% by weight, and more desirably 30 to 50% by weight based on the total amount of the high melting point component and low melting point component, since an excellent strength and shape maintenance can be obtained when such pre-filtration layer was formed into filters. When the content of the low melting point component is less than 10% by weight, many fluffs are formed and the strength is lowered even when the fiber web is heat treated since the number of adhering points of fibers is small, and thus the use of low melting point component loses its meaning. Conversely, when the content of the low melting point component exceeds 90% by weight, the low melting point component which lost the shape of fiber by the heat treatment partially fill the voids between fibers or void diameter becomes larger, and thus a deterioration in filtration capacity of filters is unpreferably caused. As examples of the combination of a low melting point component with a high melting point component, polyethylene/polypropylene, propylene copolymer/polypropylene, low melting point copolyester/polyester, and polyethylene/polyester can be mentioned. Among them, the combination of propylene copolymer/polypropylene or low melting point copolyester/polyester is preferable since bonding power between fibers by heat treatment is strong and thus filters having a high strength can be obtained. Next, explanation is given to a precision filtration layer which is a part of the filters of the present invention.

Among the filter mediums which form the filters of the present invention, the precision filtration layer is disposed on the downstream side of the pre-filtration layer and provided to capture minute particles which were unable to capture with the pre-filtration layer. Precision filtration layer comprises one or more piled layers of a non-woven fibrous agglomerate in such a shape as non-woven fabric and filter paper.

As a result of diligent investigation by the present inventors, it has been found that both of the fiber diameter and the void percentage of the non-woven fibrous agglomerate which forms the precision filtration layer have a large effect in order to improve the filtration performances of the filters of the present invention.

Precision filtration layer may be a layer of a non-woven fibrous agglomerate or may be layers in which two or more kind of non-woven fibrous agglomerates are alternately piled. However, among the fibers in the non-woven fibrous agglomerate which forms the precision filtration layer, at least 10% by weight of the fibers must have a diameter smaller than that of the fibers having a smallest diameter in the pre-filtration layer. When this ratio is lower than 10% by weight, there is a risk that most of the particles which were not captured through the pre-filtration layer can not be captured even with the precision filtration layer.

Void ratio of the non-woven fibrous agglomerate comprised in the precision filtration layer is generally 45 to 97%, preferably 55 to 85%, and more desirably 55 to 65%. In the case where the void ratio is lower than 45%, the pressure loss becomes large when it is used as filter, and filtration life becomes short since there is no sufficient spaces to hold cake. Conversely, in the case where the void ratio is higher than 97%, sufficient pressure resistance and shape maintenance are sometimes lost when used as filter.

Diameter of the fibers comprised in the non-woven fibrous agglomerate of the precision filtration layer which is smaller than that of fibers having a smallest diameter can be decided depending on the intended filtration accuracy. Specifically, first, the diameter of the fibers which form the non-woven fibrous agglomerate of the precision filtration layer is suitably 0.5 to 5 times and preferably 0.8 to 3 times as large as the intended filtration accuracy (unit: $\mu$m). When the fiber diameter is smaller than 0.5 times as large as an objective filtration accuracy, it is necessary to considerably increase the void ratio, and thus the pressure resistance will be lowered. When the fiber diameter is larger than 5 times as large as the objective filtration accuracy, it is necessary to considerably decrease the void ratio, and thus the filtration life will become short. In this connection, when fibers having a not-circular cross-section are used as material, the fiber diameter may be rather large, since the capturing efficiency is high compared with the fibers having a circular cross-section.

Next, a smallest diameter of the fibers in the pre-filtration layer is suitably about 1.1 to about 20 times as large as the diameter of the fibers which are comprised in the precision filtration layer and have a diameter smaller than that of the fibers having a smallest diameter in the pre-filtration layer. When this ratio is smaller than 1.1 times, disposal of the precision filtration layer loses its meaning, but when it exceeds 20 times, many particles fill the precision filtration layer and thus the filtration life sometimes becomes short since it becomes impossible to capture a sufficient amount of particles with the pre-filtration layer.

As the method for preparing the fibers which are comprised in the precision filtration layer and have a diameter smaller than that of the fibers of a smallest diameter in the pre-filtration layer, a process of using split fibers, process of using glass fibers, melt-blow process, and spun-bond process can be mentioned. Among these, a melt blow method or method of using glass fibers can preferably be used particularly when the filtration accuracy of lower than 5 $\mu$m is intended.

The reason why the diameter of 10% by weight or more of the fibers in the non-woven fibrous agglomerate of the precision filtration layer is decided to be smaller then that of the fibers having a smallest diameter in the pre-filtration layer is that the formation of a fibrous agglomerate in which fiber diameter is gradually decreased down to a sufficiently small diameter in the direction of filtration only by the pre-filtration layer is difficult. That is, since a special spinning process in which the diameter of constituent fibers is continuously changed is adopted for preparation of the pre-filtration layer in the present invention, it is difficult to decrease the smallest fiber diameter in the pre-filtration layer over a certain level. For instance, when the diameter of the fibers in the fibrous agglomerate of the pre-filtration layer is changed by continuously changing spinning conditions such as the amount of a resin to be extruded and the ejecting velocity of a blowing gas stream by using a melt-blow process, it is necessary to conduct the spinning at a comparatively low temperature in correspondence with the fibers having a largest diameter in the pre-filtration layer. However, when the blowing gas stream was excessively increased at the low spinning temperature or when the amount of the resin to be extruded was excessively decreased, flies (flocks flying without collected on a collecting conveyer net) are formed and such a phenomenon that a non-woven fibrous agglomerate comprising fibers having an intended smallest diameter can not be obtained is presented. Such a problem occurs even when other melt spinning processes are used. Accordingly, it is difficult to decrease the diameter of the fibers having a smallest diameter in the pre-filtration layer to smaller than 2 m. According to the present invention, an intended precision filtration can be achieved by disposing the precision filtration layer comprising a non-woven fibrous agglomerate including 10% by weight or more of the fibers having a diameter smaller than that of the fibers having a smallest diameter in the pre-filtration layer, in addition to the pre-filtration layer. When the pre-filtration layer is prepared by a melt-blow or another process, it is necessary to use such a non-woven fibrous agglomerate of ultrafine denier as a melt-blow non-woven fabric or glass fiber non-woven fabric even as non-woven fibrous agglomerate comprised in the precision filtration layer.

Usually, the fiber diameter of either melt-blow non-woven fabrics and glass fiber non-woven fabrics is not constant, but distributed in a certain degree of range, and the filtration accuracy is decided principally by their average fiber diameter and void ratio in the case of those non-woven fabrics. Accordingly, when the fiber diameter of a melt-blow non-woven fabrics or glass fiber non-woven fabrics is described hereinafter, the term "fiber diameter" is intended to mean the average fiber diameter unless otherwise specified. When a melt-blow non-woven fabric is adopted, it is possible to control the average fiber diameter to a value between 0.5 and 40 $\mu$m by the selection of spinning conditions. When a glass fiber non-woven fabric is used, the average fiber diameter can be controlled to a value between, 0.1 and 30 $\mu$m. Void ratio of these non-woven fabrics can be adjusted to an appropriate value by compressing these non-woven fabrics by using a calender roll or the like.

Since the void ratio of melt-blow non-woven fabrics at the time when a resin was spun is generally about 80 to about 95%, they may be processed by an appropriate method to make the void ratio of a non-woven fibrous agglomerate of a precision filtration layer comprising fibers having a diameter smaller than that of the fibers having a smallest diameter in a pre-filtration layer to a desired value. In such a case, a non-woven fibrous agglomerate which forms the pre-filtration layer and a non-woven fibrous agglomerate of the precision filtration layer comprising the fibers having a diameter smaller than that of the fibers having a smallest diameter in the pre-filtration layer can be prepared in separate steps.

The processing method is not particularly limited, and a compaction processing can be mentioned as an example. Shape on the surface of a calender roll is preferably flat. Whereas an embossing roll having an appropriate pattern can be used, it is preferable to use a flat roll in cases other than that where special purposes such as the purpose of reinforcing a non-woven fabric are intended since the portions compressed with the embossing pattern do not pass liquid. While it depends of the material of the non-woven fibrous agglomerates, the temperature of the calendar roll is suitably lower than the melting point of the non-woven fibrous agglomerate (melting point of a low melting point component in the case of composite materials) by 10° C. to 60° C. in general. When this difference in temperature is less than 10° C., there is a possibility that the resin is melted and adhered on the surface of a roll. Conversely, when that temperature difference is more than 60° C., the compaction processing sometimes loses its meaning since the compacted conditions can not be fixed.

Also, it is possible to impart an optional difference in apparent density between a pre-filtration layer and a precision filtration layer by adjusting the void ratio of the non-woven fibrous agglomerate of the precision filtration layer comprising the fibers having a diameter smaller than that of the fibers having a smallest diameter in the pre-filtration layer by a compaction processing. The term "apparent density" used herein is intended to mean the value obtained by dividing the weight of a part of a filter material by the volume of the part including the voids therein. By imparting the difference in the apparent density, a function of pre-filtration layers to capture comparatively large particles is efficiently enhanced. Whereas the void ratio of a precision filtration layer may be larger than that of a pre-filtration layer in the filters of the present invention, the function of the pre-filtration layer described above is more enhanced when the former is smaller than the latter. More desirable cases are ones where a void ratio of a pre-filtration layer is 55% to 90%, and the value obtained by subtracting the void ratio (%) of a precision filtration layer from the void ratio (%) of a pre-filtration layer is in the range between 5% and 45%. When the difference in the void ratios is less than 5%, much effect is not achieved. Whereas the effect of a pre-filtration layer becomes larger with the increase of the difference in the void ratios, when this value exceed 45%, the strength of the pre-filtration layer becomes not-sufficient since it is necessary to increase the void ratio of the pre-filtration layer to higher than 90%.

Next, explanation is given to a support layer which is used in the filters of the present invention as required.

Among the filter mediums from which the filters of the present invention are formed, the support layer is disposed on immediately downstream of a precision filtration layer to maintain the shape of the precision filtration layer and to prevent a filter medium from falling off the precision filtration layer. However, when the precision filtration layer has a sufficient shape maintenance, when a suitable supporting body is used for maintaining the shape of the precision filtration layer, or when there is not any possibility that the filter medium is fallen off the precision filtration layer, the support layer may not be used. As a non-woven fibrous agglomerate from which the supporting layer is formed, the same non-woven fibrous agglomerate as that used to form the pre-filtration layer described above may be used, and such a non-woven fibrous agglomerate having a higher strength as a spun bond non-woven fabric may be used.

The diameter of the fibers which are used in the non-woven fibrous agglomerate of the support layer are typically larger than the diameter of the fibers used in the precision filter layer. Further, at least a part of the fibers which make up the non-woven fibrous agglomerate in the support layer may be bonded together. Such bonding may be by heat treatment or other suitable means.

Figure 1:
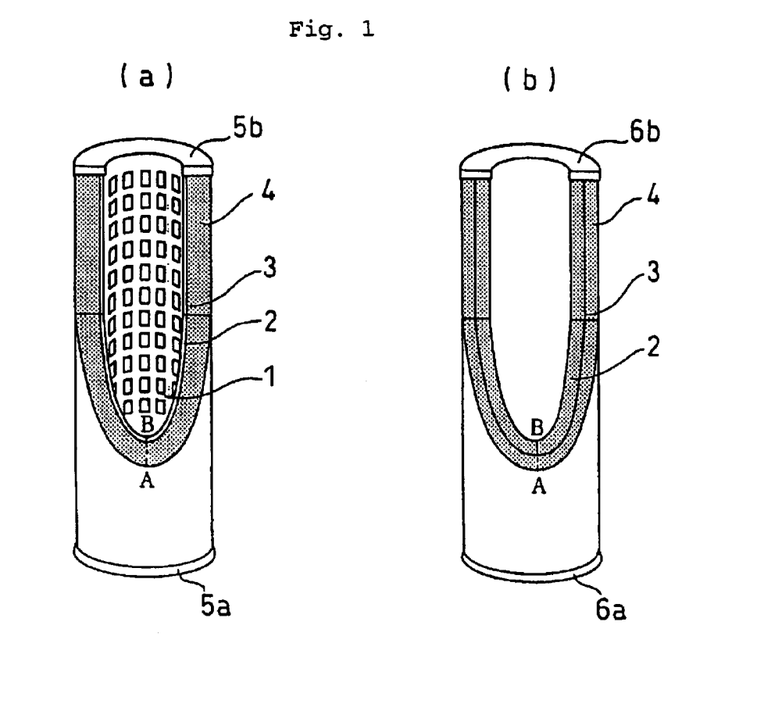
FIG. 1 is a partially cut away perspective view of a cylindrical filter of the present invention.
Figure 2:
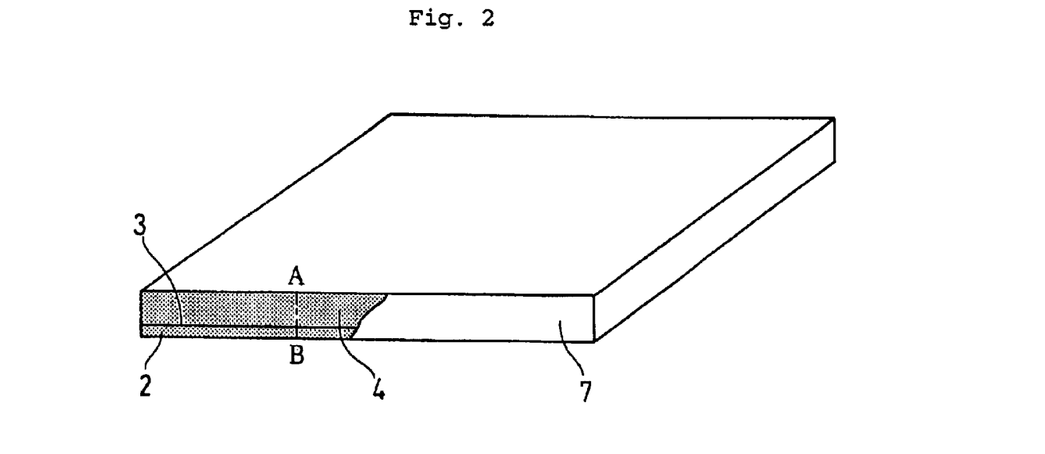
FIG. 2 is a partially cut away perspective view of a flat board-like filter of the present invention.

Now, explanation is given to the methods for forming the filters of the present invention by using these mediums in combination. Examples of formed filters are shown in FIG. 1. FIGS. 1(a) and (b) are examples of cylindrical filters. FIG. 2 shows an example of a flat board-like filter. Filters of the present invention are not limited necessarily to those examples provided that the filters comprise a pre-filtration layer in which the diameter of constituent fibers gradually decreases from the upstream side toward the downstream side, and a precision filtration layer comprising fibers having a diameter smaller than that of the fibers having a smallest diameter in the pre-filtration layer.

The present invention will be described in more detail with reference to drawing.

Each of FIGS. 1(a) and (b) is a partially cut away perspective view of a cylindrical filter showing an example of the present invention, respectively. In the same way, FIG. 2 is a partially cut away perspective view of a flat board-like filter. The filter shown in FIG. 1(a) comprises support layer 2 supported with porous support cylinder 1 precision filtration layer 3 disposed on the support layer 2, pre-filtration layer 4 disposed outside the precision filtration layer 3, and end caps 5a and 5b disposed so as to seal both end portions of a cylindrical filter. The filter shown in FIG. 1(b) is one in which such porous support cylinder 1 as used in the filter of FIG. 1(a) is not used, support layer 2 is changed to a thick layer, and flat gaskets 6a and 6b are provided. The filter shown in FIG. 2 comprises flat board-like support layer 2, precision filtration layer 3 disposed on the support layer 2, pre-filtration layer 4 disposed on the precision filtration layer 3, and film 7 so as to provided to seal edge faces.

In order to prepare the cylindrical filter shown in FIG. 1(a), first, a non-woven fibrous sheet used for reinforcing is wound round porous support cylinder 1 to form support layer 2. The non-woven fibrous sheet used for reinforcing described above has a role of protecting a filter medium from falling off precision filtration layer 3, and as its material, a spun bond non-woven fabric and the like can preferably be used. When there is not any possibility that a filter medium would fall off precision filtration layer 3, the reinforcing non-woven fibrous sheet may not be used. Then, a non-woven fibrous agglomerate, which comprises fibers having a diameter smaller than that of the fibers having a smallest diameter in a pre-filtration layer and was prepared in advance to form precision filtration layer 3, is wound thereon at least 1.5 times to form precision filtration layer 3. At this time, an appropriate spacer may simultaneously be wound together to improve the liquid passability. The shape of the spacer is not particularly limited, and such various materials as a knitted good, net, and punched sheet may be used. Next, a non-woven fibrous agglomerate, which was prepare in advance as material for forming a pre-filtration layer, is wound thereon to form pre-filtration layer 4 in which fiber diameter is continuously decreased from the upstream side toward the downstream side. Thereafter, end caps 5a and 5b are stuck at both ends to prevent liquid from flowing out of the end portions and to improve the close adherence property with a housing thereby complete the production of a filter of the present invention.

In order to produce the cylindrical filter shown in FIG. 1(b), a method disclosed in Japanese Patent Publication No. Sho 56-49605 can be used. In this case, a non-woven fibrous agglomerate composed of hot-melt adhesive fibers is used as a non-woven fibrous agglomerate for forming pre-filtration layer 4. As an example, a non-woven fibrous agglomerate composed of a high melting point resin and a low melting point resin having a difference in melting point of more than 10° C. can be mentioned. While this non-woven fibrous agglomerate is used as the material for pre-filtration layer 4, it is also used as a material for support layer. First, a non-woven fibrous agglomerate which forms pre-filtration layer 4 is heated in advance at a temperature higher than the hot-melt adhering temperature of the non-woven fibrous agglomerate, and wound round a suitable winding core to form support layer 2. Thereafter, a non-woven fibrous agglomerate, which has the same width as that of the non-woven fibrous agglomerate of pre-filtration layer 4 and was prepared in advance so as to form precision filtration layer 3 comprising fibers having a diameter smaller than that of the fibers having a smallest diameter in a pre-filtration layer, is wound together with the non-woven fibrous agglomerate for forming the pre-filtration layer so that the number to times of the winding becomes at least 1.5 to form precision filtration layer 3, and then successively winding only the non-woven fibrous agglomerate for forming the pre-filtration layer thereon to form pre-filtration layer 4 in which fiber diameter is gradually decreased in the direction of filtration. When the number of winding of the non-woven fibrous agglomerate for forming precision filtration layer 3 is less than 1.5 times, a sufficient filtration accuracy can hardly be attained since the thickness of the precision filtration layer is small. The place at which the non-woven fibrous agglomerate for forming precision filtration layer 3 is wound is the position where the ratio of the thickness of pre-filtration layer 4 to that of support layer (thickness of pre-filtration layer/thickness of support layer) becomes 0.5 to 4 and preferably 0.7 to 4. When the thickness of the pre-filtration layer becomes more than 4 times as large as the thickness of the support layer, the strength of the support layer becomes insufficient. On the other hand, when it becomes smaller than 0.5 times, the accumulation in the pre-filtration layer becomes small and thus it becomes difficult to lengthen the filtration life of filters. Thereafter, they are cooled, a winding core is pulled out, and flat gaskets 6a and 6b are stacked on both ends to complete the production of a filter of the present invention.

In order to produce the flat board-like filter shown in FIG. 2, a non-woven fibrous agglomerate comprising a high melting point resin and a low melting point resin having a difference in melting point of 10° C. or more is used as the nonwoven fibrous agglomerate for forming pre-filtration layer 4. While this non-woven fibrous agglomerate is a material for pre-filtration layer 4, a part of the agglomerate can be used as material for the support layer. This non-woven fibrous agglomerate is heated at the melt adhering temperature or higher temperature, and then folded into a pile to form support layer 2. On this support layer 2, at least one non-woven fibrous agglomerate, having the same width as that of a non-woven fibrous agglomerate which forms pre-filtration layer 4, is piled to form precision filtration layer 3. Subsequently, only a non-woven fibrous agglomerate which forms pre-filtration layer 4 is piled on the precision filtration layer described above to form pre-filtration layer. Then, film 7 is pasted on the wall face to avoid the efflux of liquid.

Next, designing of fiber diameter of the filters of the present invention is described. It was found by the present inventors that the design of fiber diameter of a pre-filtration layer is particularly important as -a factor for deciding liquid passability and filtration life of the filters of the present invention.

First, while the ratio of a maximum fiber diameter to a minimum fiber diameter (maximum fiber diameter/minimum fiber diameter) in pre-filtration layer 4 is effective when it is 2 or greater, the ratio is preferably 3 or greater, and more desirably 4 or greater since many times the size of particles in original liquids (liquids to be filtered) is widely distributed in general. However, the ratio is generally lower than 20 and preferably lower than 10 since even when the ratio was changed more than necessary, a layer for capturing particles having a size corresponding to the fiber diameter becomes thin, and conversely it becomes impossible to sufficiently perform a deep layer filtration.

When the ratio of a maximum fiber diameter in a pre-filtration layer to the diameter of the fibers in the non-woven fibrous agglomerate comprised in a precision filtration layer and having a diameter smaller than a smallest diameter in the pre-filtration layer (maximum fiber diameter in a pre-filtration layer/diameter of the fibers in the non-woven fibrous agglomerate having a diameter smaller than a smallest diameter in the pre-filtration layer) is in the range of 2.2 to 200, more effect is achieved. When this value is less than 2.2 times, filtration life becomes short since it becomes insufficient to impart the change in fiber diameter and the voids in a pre-filtration layer are filled with particles before precision filtration layer is sufficiently used. Besides, when this value exceeds 200, a layer for capturing particles corresponding to the fiber diameter becomes thin depending on liquids, and conversely it becomes impossible to sufficiently perform a deep-layer filtration.

Next, the pattern of the change of fiber diameter in the direction of liquid flow in the filters of the present invention is described.

Figure 3:
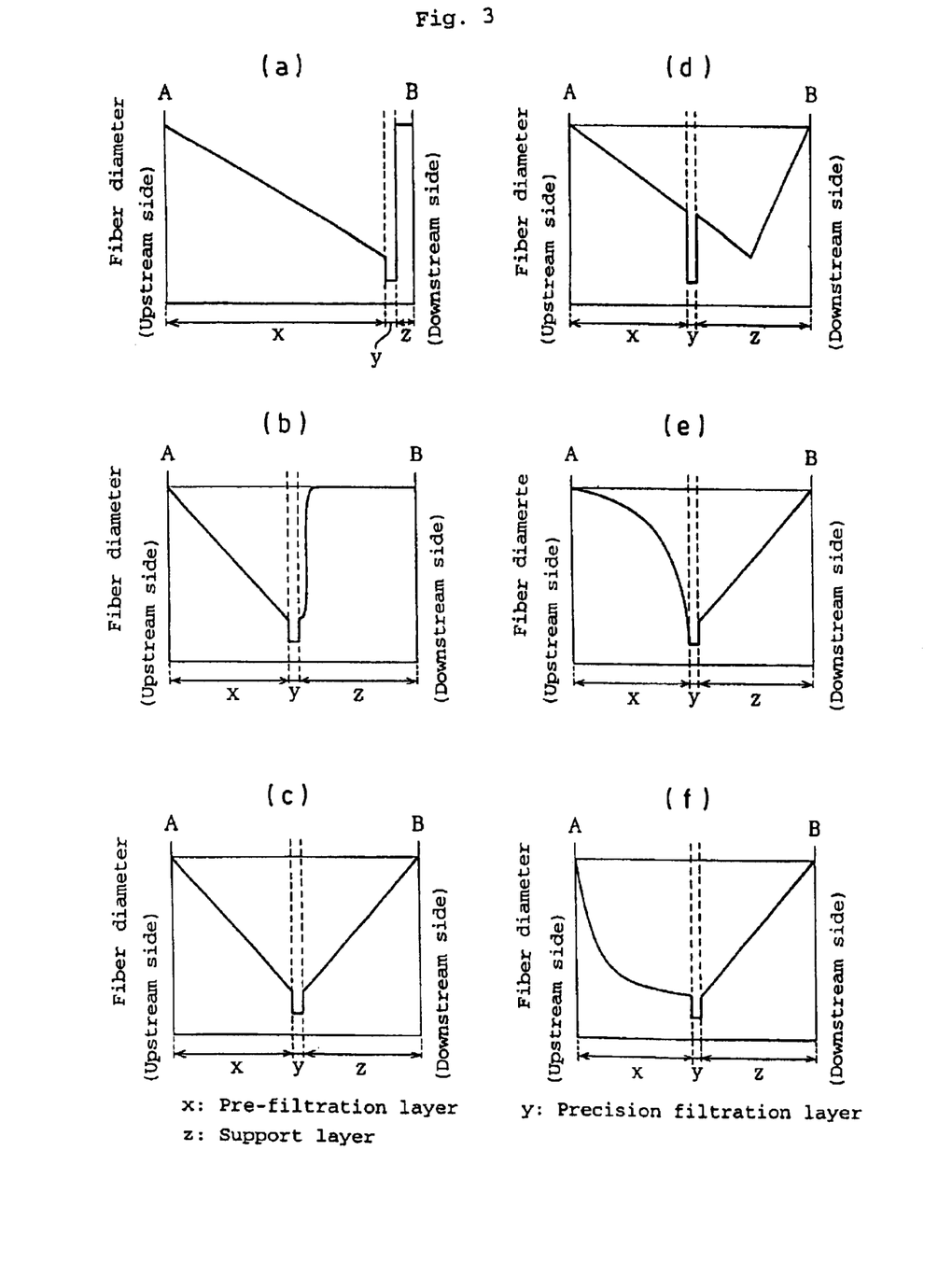
FIG. 3 is diagrammatic representations showing the patterns of change in fiber diameter at the cross-section A-B from the upstream to downstream in such a filter as shown in FIG. 1 or FIG. 2.

FIG. 3 is diagrammatic representation showing examples of the pattern of change of fiber diameter in the direction of filtration, that is, at the layers between A and B, from the upstream to the downstream in a cross-section of such a filter as shown in FIG. 1 or FIG. 2. Whereas when two or more kind of non-woven fibrous agglomerates are piled alternatively, the diameter of the fibers in a precision filtration layer becomes discontinuous, the diameter of the fibers of a non-woven fibrous agglomerate comprised in a precision ration layer and having a diameter smaller than that of the fibers having a smallest fiber diameter in a pre-filtration layer is indicated herein as representative value.

FIG. 3(a) shows a standard pattern of the change in the fiber diameter imparted in a filter, which can be used for a wide field of filtration. That is, pre-filtration layer x begins with a maximum fiber diameter, and the fiber diameter is decreased straight toward the downstream. At a position near the downstream side, precision filtration layer y is disposed. Whereas support layer z is disposed at a position far near the downstream side of the precision filtration layer, this may not be disposed when there is not any possibility that a filter medium is fell off a precision filtration layer.

When a support layer is disposed on the downstream side to maintain the shape of a precision filtration layer, it is preferably arranged as shown in FIG. 3(b) or (c). That is, support layer z having a sufficient thickness compared with whole thickness of a filter is disposed to maintain the shape of the filter. Since support layer z scarcely contributes the capture of particles, it is preferably composed by fibers having a large diameter as shown in (b) to increase the liquid passability. Conversely, in the case where a non-woven fibrous agglomerate continuously prepared is used both for pre-filtration layer x and support layer z, rather when the pattern is arranged as shown in (c), such an advantage that the layers can more readily be manufactured is derived since the fiber diameter can be changed by gradually changing spinning conditions.

Design of fiber diameter change may be arranged as shown in FIG. 3(d). However, since the difference between a smallest fiber diameter in pre-filtration layer x and the fiber diameter in precision filtration layer y becomes large in such case, adoption of such design is limited only to a case where a special reason such as strength maintenance exists.

Besides, when many large particles are contained in original liquids, it is preferable to relatively increase the fiber diameter on the upstream side as shown in FIG. 3(e). This is because filtration can be performed without blocking of filter surface with the large particles since such filters have many spaces for capturing large particles on the upstream side.

Further, when many small particles are contained in original liquids, the thickness of the portion having a smallest fiber diameter in a pre-filtration layer is preferably increased as shown in FIG. 3(f). By using this pattern, filtration life can be extended since comparatively small particles in the original liquids can sufficiently be held by pre-filtration layer x and thus the load to precision filtration layer y is decreased.

EXAMPLES

Now, the present invention will be described in more specific with reference to Examples. However, it should be understood that the present invention is by no means restricted by such specific Examples. Definitions and methods for determining physical properties of the fibers and filters in the Examples are as follows:

Fiber Diameter

With respect to staple fibers, the fiber diameter was obtained from the fineness based on corrected weight. With respect to melt-blow non-woven fabrics, spun bond non-woven fabrics, and glass fiber non-woven fabrics, 100 fibers were randomly selected from a picture image taken by an electron microscope, and the arithmetical average value of their diameter was assumed to be the average fiber diameter. With respect to the melt-blow non-woven fabrics, spun bond non-woven fabrics, and glass fiber non-woven fabrics, "fiber diameter" is intended to indicate this average fiber diameter unless otherwise specified.

Filtration Accuracy

One filter was fitted on a housing of a circulation type filter performance tester, and water was circulated from a 50 l water tank through the filter with a pump. After the flow rate was adjusted to 10 l/min, fine test dust for air cleaners (abbreviated as ACFTD; medium diameter: 6.6 to 8.6 μm) which is a standard powder for testing basic physical properties was continuously added as test powder into the water tank at a rate of 1 mg/min, the original liquid and filtrate were sampled 5 minutes after beginning of the addition, and then the size distribution of the particles contained in each of the liquids was calculated by using a light scattering type particle detector. By using the result of the determination of particle size distribution, the ratio of the number of particles captured by a filter was calculated as capturing efficiency, and the diameter of the particles which were captured 99.9% was assumed to be the filtration accuracy of the filter.

Initial Pressure Loss, Filtration Life, and Pressure Resistant Strength

One filter was fitted to the housing of the circulation type filter performance tester described above and water was circulated through the filter at a flow rate of 10 l/min. Industrial test powder JIS 16 was continuously added to the water at a rate of 400 mg/min, the pressure both at the primary side and secondary side was determined, and the change in pressure loss was recorded. The elapsed time until the pressure loss in a filter reached 2 kg/cm² was assumed to be filtration life. Pressure loss in the filter prior to the addition of a cake was assumed to be initial pressure loss.

Continuously, the powder described above was added, and the pressure loss at the time when the pressure loss in the filter reached 10 g/cm² or at the time when the filter was deformed is assumed to be pressure resistant strength.

Example 1

As a non-woven fibrous agglomerate which forms a pre-filtration layer, a melt-blow non-woven fabric comprising a mixture of propylene copolymer fibers (melting point 140° C.) and polypropylene fibers (melting point 165° C.) in a weight ratio of 5:5, and having a METSUKE (a Japanese term meaning "weight of fabric per unit area") of 5 g/m² and thickness of 500 μm was prepared. Fiber diameter of the fabric was changed from 15 μm to 2 μm by gradually increasing the amount of the blowing gas stream, then maintained at the state of 2 μm for a while, and then changed again from 2 μm to 15 μm by decreasing the amount of the blowing gas stream.

As a non-woven fibrous agglomerate which forms a precision filtration layer, a melt-blow non-woven fabric having a METSUKE of 75 g/m² and a thickness of 200 μm and comprising polypropylene fibers having an average diameter of 1 μm was prepared.

Next, the non-woven fibrous agglomerate for forming the pre-filtration layer was heated at 150° C., wound while heating to melt round a metal core having a diameter of 30 mm until the average position where fiber diameter became minimum (2 μm) to form a support layer having a thickness of 5 mm. Then, a non-woven fibrous agglomerate which forms a precision filtration layer was wound together with the non-woven fibrous agglomerate which forms a pre-filtration layer so that the non-woven fibrous agglomerate for forming the precision filtration layer was wound 7 times to form a precision filtration layer having a thickness of 2 mm. Subsequently, only a non-woven fibrous agglomerate which forms a pre-filtration layer was wound to form a pre-filtration layer having a thickness of 13 mm to prepare a cylindrical filter having an outside diameter of 70 mm, inside diameter of 30 mm, and length of 245 mm. The change in fiber diameter in the filter was controlled as shown in FIG. 3(c). Both end portions of the filter were sealed with a flat gasket (prepared by cutting a foamed polyethylene having a foaming ratio of 3 times and a thickness of 3 mm into a doughnut shape) to make the overall length 250 mm. For adhering the flat gasket with the filter, a hot-melt adhesive was used. The characteristics and performances of the filter thus obtained are shown in Table 1.

Example 2

As the non-woven fibrous agglomerate for forming a pre-filtration layer, the same non-woven fibrous agglomerate as used in Example 1 was used. As the non-woven fibrous agglomerate for forming a precision filtration layer, a melt-blow non-woven fabric comprising polypropylene fibers and having a METSUKE of 25 g/m², thickness of 500 μm, and average fiber diameter of 1 μm was used. These fabrics were formed by the same manner as in Example 1 into a cylindrical filter having an outside diameter of 70 mm, inside diameter of 30 mm, and overall length of 250 mm, and provided with flat gaskets. The characteristics and performances of the filter thus obtained are shown in Table 1.

Example 3

As the non-woven fibrous agglomerate for forming a pre-filtration layer, the same non-woven fibrous agglomerate as used in Example 1 was used. As the non-woven fibrous agglomerate for forming the polypropylene non-woven fabric used for forming the precision filtration layer in Example 1, a glass fiber non-woven fabric (Trade name: FM-2A, produced by Japan Inorganic Co., Ltd.) having a METSUKE of 150 g/m², thickness of 1,000 μm, and average fiber diameter of 0.7 μm was used. These fabrics were molded by the same manner as in Example 1 into a cylindrical filter having an outside diameter of 70 mm, inside diameter of 30 mm, and overall length of 250 mm, and provided with flat gaskets. The characteristics and performances of the filter thus obtained are shown in Table 1.

Example 4

As a non-woven fibrous agglomerate which forms a pre-filtration layer, a melt-blow non-woven fabric comprising a mixture of propylene copolymer fibers (melting point 140° C.) and polypropylene fibers (melting point 165° C.) in a weight ratio of 5:5, and having a METSUKE of 50 g/m² and thickness of 500 μm was prepared. Fiber diameter of the fabric was changed from 20 μm to 3 μm by gradually increasing the amount of the blowing gas stream, then maintained at the state of 3 μm for a while, and then changed again from 3 μm to 15 μm by decreasing the amount of the blowing gas stream.

As a non-woven fibrous agglomerate which forms a precision filtration layer, a melt-blow non-woven fabric comprising polypropylene fibers and having a METSUKE of 25 g/m² and a thickness of 50 μm and comprising fibers having an average diameter of 1 μm was prepared. These fabrics were formed by the same manner as in Example 1 into a cylindrical filter having an outside diameter of 70 mm, inside diameter of 30 mm, and overall length of 250 mm, and provided with flat gaskets. The characteristics and performances of the filter thus obtained are shown in Table 1.

Example 5

As both of the non-woven fibrous agglomerate for forming a pre-filtration layer and the non-woven fibrous agglomerate for forming a precision filtration layer, the same non-woven fibrous agglomerates as used in Example 4 were used. First, a non-woven fibrous agglomerate which forms a pre-filtration layer was flatly piled in a thickness of 5 mm. Consecutively, 7 sheets of the non-woven fibrous agglomerate which forms the precision filtration layer were piled to form a precision filtration layer having a thickness of 1.5 mm. Then, only a non-woven fibrous en agglomerate which forms a pre-filtration layer was piled thereon by a thickness of 13 mm. This piled product was heated at 150° C. with a hot air dryer, cooled, and cut into a piece having an area of 0.05 m². Subsequently, a film of low density polyethylene having a thickness of 0.5 mm was adhered by heating adhesion on the side faces of the piece to block them thereby prepare a flatboard-like filter. The characteristics and performances of the filter thus obtained are shown in Table 1.

Example 6

As a non-woven fibrous agglomerate which forms a pre-filtration layer, a melt-blow non-woven fabric comprising polypropylene fibers (melting point 165° C.) and having a METSUKE of 50 g/m² and thickness of 500 μm was prepared. Fiber diameter of the fabric was changed from 15 μm to 2 μm by gradually increasing the amount of the blowing gas stream.

As a non-woven fibrous agglomerate which forms a precision filtration layer, a melt-blow non-woven fabric having a METSUKE of 75 g/m² and a thickness of 200 μm and comprising polypropylene fibers having an average diameter of 1 μm was prepared.

Spun bond non-woven fabric having a length of 15 cm, METSUKE of 30 g/m², thickness of 300 μm, and average fiber diameter of 25 μm was wound round a porous support cylinder having a diameter of 30 mm and length of 240 mm to form a support layer. Continuously, the polypropylene melt-blow non-woven fabric having a METSUKE of 75 g/m², thickness of 200 μm, and average fiber diameter of 1 μm, and described above was wound 7 times thereon, and then the melt-blow non-woven fabric comprising polypropylene fibers (melting point 165° C.) diameter of which was changed from 15 μm to 2 μm by gradually increasing the amount of blowing gas stream, having a METSUKE of 50 g/m² and thickness of 500 μm, and described above was continuously wound by a thickness of 18 mm to prepare a cylindrical filter having an outside diameter of 70 mm, inside diameter of 30 mm and length of 245 mm. As the result, the change in fiber diameter in the filter was adjusted as shown in FIG. 3(a). On both ends of the filter, an end cap was adhered by a hot-melt adhesive to make its overall length 250 mm. The characteristics and performances of the filter thus obtained are shown in Table 1.

Example 7

As a non-woven fibrous agglomerate which forms a pre-filtration layer, a melt-blow non-woven fabric of side-by-side composite fibers comprising a propylene copolymer (melting point 140° C.) and polypropylene (melting point 165° C.) was prepared. Composite ratio was 5:5 by weight, METSUKE was 50 g/m², and thickness of the fabric was 500 μm. Fiber diameter of the fabric was changed from 15 μm to 2 μm by gradually increasing the amount of the blowing gas stream, then maintained at the state of 2 μm for a while, and then changed again from 2 μm to 15 μm by decreasing the amount of the blowing gas stream.

As a non-woven fibrous agglomerate which forms a precision filtration layer, the same fibrous agglomerate as used in Example 1 was used. These fabrics were formed by the same manner as in Example 1 to prepare a cylindrical filter having an outside diameter of 70 mm, inside diameter of 30 mm, and overall length of 250 mm, and provided with flat gaskets The characteristics and performances of the filter thus obtained are shown in Table 1.

Example 8

Cylindrical filter having an outside diameter of 70 mm, inside diameter of 30 mm, and overall length of 250 mm, and provided with flat gaskets was prepared by the same manner as in Example 1 with the exception that the change in fiber diameter in the filter was adjusted as shown in FIG. 3(e). The characteristics and performances of the filter thus obtained are shown in Table 1.

Example 9

Cylindrical filter having an outside diameter of 70 mm, inside diameter of 30 mm, and overall length of 250 mm, and provided with flat gaskets was prepared by the same manner as in Example 1 with the exception that the change in fiber diameter in the filter was adjusted as shown in FIG. 3(f). The characteristics and performances of the filter thus obtained are shown in Table 1.

Comparative Example 1

As the non-woven fibrous agglomerate for forming a pre-filtration layer, the same fibrous agglomerate as used in Example 1 was used, and a cylindrical filter having an outside diameter of 70 mm, inside diameter of 30 mm, and overall length of 250 mm, and provided with flat gaskets was prepared by the same manner as in Example 1 with the exception that a precision filtration layer was not formed. The characteristics and performances of the filter thus obtained are shown in Table 1.

Comparative Example 2

In stead of disposing such a precision filtration layer as used in Example, a melt-blow non-woven fabric which comprises a mixture of a propylene copolymer fibers (melting point 140° C.) and polypropylene fibers (melting point 165° C.) and has a METSUKE of 50 g/m² and thickness of 500 μm, and in which fiber diameter is changed from 15 μm to 1 μm by gradually increasing the amount of the blowing gas stream was tried to prepare. However, such non-woven fabric was unable to prepare since flies were formed when the fiber diameter became smaller than 2 μm.

Comparative Example 3

Cylindrical filter having an outside diameter of 70 mm, inside diameter of 30 mm, and overall length of 250 mm, and provided with flat gaskets was prepared by the same manner as in Example 3 with the exception that a card web of polypropylene staple fibers having a diameter of 25 μm was used in place of a non-woven fibrous agglomerate for forming a pre-filtration layer. The characteristics and performances of the filter thus obtained are shown in Table 1.

Comparative Example 4

Cylindrical filter having an outside diameter of 70 mm, inside diameter of 30 mm, and overall length of 250 mm, and provided with flat gaskets was obtained by forming fabrics by the same manner as in Example 1 with the exception that as a non-fibrous agglomerate for forming a precision filtration layer, a melt-blow non-woven fabric having a METSUKE of 75 g/m² and thickness of 200 μm, and comprising polypropylene fibers having an average diameter of 3 μm which was prepared first by preparing a melt blow non-woven fabric having a METSUKE of 75 g/m² and thickness of 500 μm, and comprising polypropylene fibers having an average diameter of 3 μm, and then compacting the non-woven fabric with a flat roll at 120° C. was used. The characteristics and performances of the filter thus obtained are shown in Table 1.

TABLE 1

| | | Prefiltration Layer | | |
|---|---|---|---|---|
| | Material | Maximum fiber diameter ($\mu$m) | Minimum fiber diameter ($\mu$m) | Void ratio (%) |
| Example 1 | PP + propylene copolymer | 15 | 2 | 89 |
| Example 2 | PP + propylene copolymer | 15 | 2 | 89 |
| Example 3 | PP + propylene copolymer | 15 | 2 | 89 |
| Example 4 | PP + propylene copolymer | 20 | 3 | 89 |
| Example 5 | PP + propylene copolymer | 20 | 3 | 89 |
| Example 6 | PP | 15 | 2 | 89 |
| Example 7 | PP + propylene copolymer | 15 | 2 | 89 |
| Example 8 | PP + propylene copolymer | 15 | 2 | 89 |
| Comparative Example 1 | PP + propylene copolymer | 15 | 2 | 89 |
| Comparative Example 3 | PP + propylene copolymer | 25 | (25) | 75 |
| Comparative Example 4 | PP + propylene copolymer | 15 | 2 | 70 |

| | Precision Filtration Layer | | | Filter Performances | | | |
|---|---|---|---|---|---|---|---|
| | Material | Fiber diameter ($\mu$m) | Void ratio (%) | Filtration Accuracy | Initial pressure loss (kg/cm$^2$) | Filtration life (min) | Pressure resistant strength (kg/cm$^2$) |
| Example 1 | PP | 1 | 59 | 1 | 1 | 44 | 10 < |
| Example 2 | PP | 1 | 95 | 2 | 0.3 | 61 | 10 < |
| Example 3 | Glass | 0.7 | 93 | 2 | 0.3 | 66 | 10 < |
| Example 4 | PP | 1 | 95 | 3 | 0.1 | 110 | 10 < |
| Example 5 | PP | 1 | 95 | 3 | 0.1 | 220 | 10 < |
| Example 6 | PP | 1 | 59 | 1 | 1 | 59 | 10 < |
| Example 7 | PP | 1 | 59 | 1 | 1 | 44 | 10 < |
| Example 8 | PP | 1 | 59 | 1 | 1 | 42 | 10 < |
| Example 9 | PP | 1 | 59 | 1 | 1 | 46 | 10 < |
| Comparative Example 1 | Not-used | — | — | 4 | 0.3 | 66 | 10 < |
| Comparative Example 3 | PP | 1 | 95 | 5 | 0.1 | 11 | 10 < |
| Comparative Example 4 | PP | 3 | 59 | 2 | 0.5 | 48 | 10 < |

From Table 1, it can be understood that despite the fact that there is little difference in initial pressure loss and filtration life between Example 2 and Comparative Example 1, the filter of Example 2 exhibits a performance of remarkably high filtration accuracy compared with that of Comparative Example 1. It can be seen that despite the fact that there is little difference in filtration accuracy between Example 4 and Comparative Example 1, the filter of Example 4 exhibits performances of a remarkably low initial pressure loss and long filter life as compared with those of the filter of Comparative Example 1. When the results of Example 4 and Comparative Example 3 are compared, it can be seen that the filter of Example 4 exhibits a higher accuracy and longer filtration life.

When the results of Examples 1, 8, and 9 are compared, the filter of Example 9 has a longest filtration life, and the filtration life became longer in the order of Example 1 and Example 8.

Further, compared with Example 2 wherein a non-woven fabric having a small fiber diameter was inserted as it is, filtration accuracy was remarkably increased in Example 1 wherein a precision filtration layer was compacted with a flat roll, indicating that the filter of Example 1 is useful for removing minute particles. However, it can be seen that a sufficient effect can not be obtained only by inserting a merely compacted non-woven fabric, since whereas the filter of Comparative Example 4 which comprises a precision filtration layer prepared by compacting a non-woven fabric having a fiber diameter larger than that of a pre-filtration layer has about the same extent of filtration accuracy as that of Example 2, initial pressure loss and filtration life of Comparative Example 4 are considerably inferior to Example 2.

Industrial Applicability

According to the present invention, filters exhibiting such performances as a high accuracy, small initial pressure loss, and long filter life can be provided.

We claim:

1. A cylindrical filter of a high accuracy composed of non-woven fibrous agglomerates and comprising at least three layers of a pre-filtration layer, a precision filtration layer, and a support layer disposed in the direction of filtration, said pre-filtration layer being formed with a non-woven fibrous agglomerate prepared by a melt-blow process, and the diameter of all or part of the fibers constituting said non-woven fibrous agglomerate in said pre-filtration layer becomes gradually smaller toward the direction of filtration, said precision filtration layer comprising one or more non-woven fibrous agglomerates, and the diameter of fibers which account for 10% by weight or more of the fibers in said one or more non-woven fibrous agglomerates in the precision filtration layer being smaller than the diameter of the fibers having a smallest diameter in said pre-filtration layer, and said support layer being formed with a non-woven fibrous agglomerate in which at least a part of the fibers are bonded by heat treatment, and the diameter of the fibers constituting said non-woven fibrous agglomerate in said support layer is larger than the diameter of the fibers in said precision filtration layer, wherein the diameter of all or part of the fibers constituting said non-woven fibrous agglomerate in said support layer becomes gradually larger toward the direction of filtration.

2. A cylindrical filter of a high accuracy composed of non-woven fibrous agglomerates and comprising at least three layers of a pre-filtration layer, a precision filtration layer, and a support layer disposed in the direction of filtration, said pre-filtration layer being formed with a non-woven fibrous agglomerate prepared by a melt-blow process, and the diameter of all or part of the fibers constituting said non-woven fibrous agglomerate in said pre-filtration layer becomes gradually smaller toward the direction of filtration, said precision filtration layer comprising one or more non-woven fibrous agglomerates, and the diameter of fibers which account for 10% by weight or more of the fibers in said one or more non-woven fibrous agglomerates in the precision filtration layer being smaller than the diameter of the fibers having a smallest diameter in said pre-filtration layer, and said support layer being formed with a non-woven fibrous agglomerate in which at least a part of the fibers are bonded by heat treatment, and the diameter of the fibers constituting said non-woven fibrous agglomerate in said support layer is larger than the diameter of the fibers in said precision filtration layer, wherein the diameter of all or part of the fibers constituting said non-woven fibrous agglomerate in said support layer first becomes gradually smaller and then become gradually larger toward the direction of filtration.

* * * * *